(12) United States Patent
Baribault et al.

(10) Patent No.: US 11,479,199 B2
(45) Date of Patent: Oct. 25, 2022

(54) VEHICLE STEERING WHEEL COMPRISING A STEERING WHEEL CLADDING AND A SAFETY MODULE

(71) Applicant: Autoliv Development AB, Vargarda (SE)

(72) Inventors: Olivier Baribault, Chiré-en-Montreuil (FR); Jerome Papet, Chiré-en-Montreuil (FR)

(73) Assignee: Autoliv Development AB, Ogden, UT (US)

( * ) Notice: Subject to any disclaimer, the term of this patent is extended or adjusted under 35 U.S.C. 154(b) by 0 days.

(21) Appl. No.: 17/445,267

(22) Filed: Aug. 17, 2021

(65) Prior Publication Data

US 2022/0055566 A1 Feb. 24, 2022

(30) Foreign Application Priority Data

Aug. 18, 2020 (FR) ...................................... 2008544

(51) Int. Cl.
*B60R 21/203* (2006.01)
*B60R 21/264* (2006.01)

(52) U.S. Cl.
CPC ........ *B60R 21/2035* (2013.01); *B60R 21/264* (2013.01)

(58) Field of Classification Search
CPC ................................................. B60R 21/2037
See application file for complete search history.

(56) References Cited

U.S. PATENT DOCUMENTS 11,034,319 B2 * 6/2021 Spencer ............ B60R 21/21658

FOREIGN PATENT DOCUMENTS

| DE | 19625722 A1 | 1/1998 | |
| DE | 202006014054 U1 * | 1/2007 | ......... B60R 21/2037 |
| DE | 102017101227 B3 * | 3/2018 | |
| DE | 102013008819 B4 * | 7/2020 | ......... B60R 21/2037 |
| DE | 102020115031 A1 * | 12/2021 | ......... B60R 21/2037 |
| EP | 0965490 A2 * | 6/1999 | |
| EP | 1101663 A2 * | 5/2001 | ......... B60R 21/2037 |
| EP | 1108625 A2 * | 6/2001 | ............ B60R 21/217 |
| EP | 1145922 A2 * | 10/2001 | ......... B60R 21/2037 |
| EP | 1415869 B1 * | 3/2007 | ......... B60R 21/2037 |
| EP | 3284636 A1 * | 2/2018 | ............. B60Q 5/003 |
| FR | 3000458 A1 * | 7/2014 | ......... B60R 21/2037 |
| WO | WO-2013017228 A1 * | 2/2013 | ......... B60R 21/2037 |

(Continued)

*Primary Examiner* — Nicole T Verley

(74) *Attorney, Agent, or Firm* — Matthew D. Thayne; Thayne and Davis LLC

(57) ABSTRACT

A vehicle steering wheel (100) comprising:
  a frame (10) supporting at least a frame cladding portion (20) visible to an occupant of the vehicle, and a module housing (30) comprising a housing wall (31) integral with the frame cladding portion (20),
  a safety module (40) at least partially arranged in the module housing (30) and comprising a module cladding portion (50) visible to the vehicle occupant, characterized:
  in that the safety module (40) comprises at least one bearing surface (411),
  and in that, during a mounting movement of the safety module (40) in the module housing (30), the housing wall (31) is placed in a reference position by the bearing surface (411), so that the frame cladding portion (20) has a predefined fit with the module cladding portion (50).

12 Claims, 2 Drawing Sheets

(56) References Cited

FOREIGN PATENT DOCUMENTS

| WO | WO-2014042008 A1 | * | 3/2014 | ........... | B60R 21/203 |
| WO | WO-2021144207 A1 | * | 7/2021 | ............. | B60R 21/05 |
| WO | WO-2021244837 A1 | * | 12/2021 | ......... | B60R 21/2037 |

* cited by examiner

[Fig. 1]
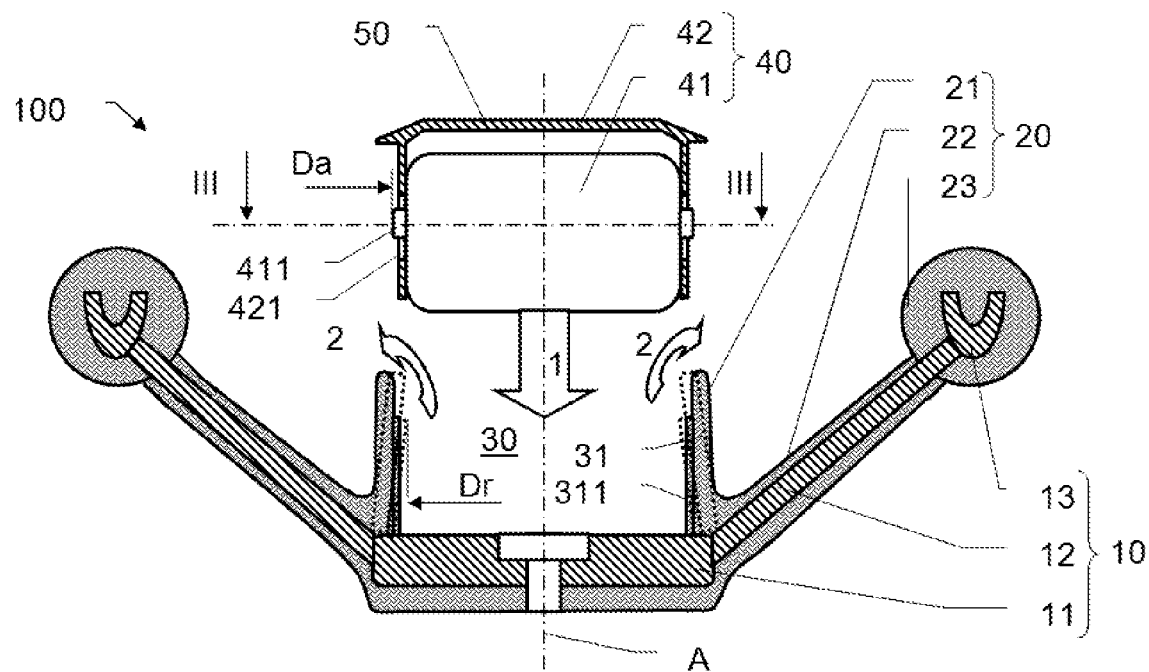
[Fig. 2]
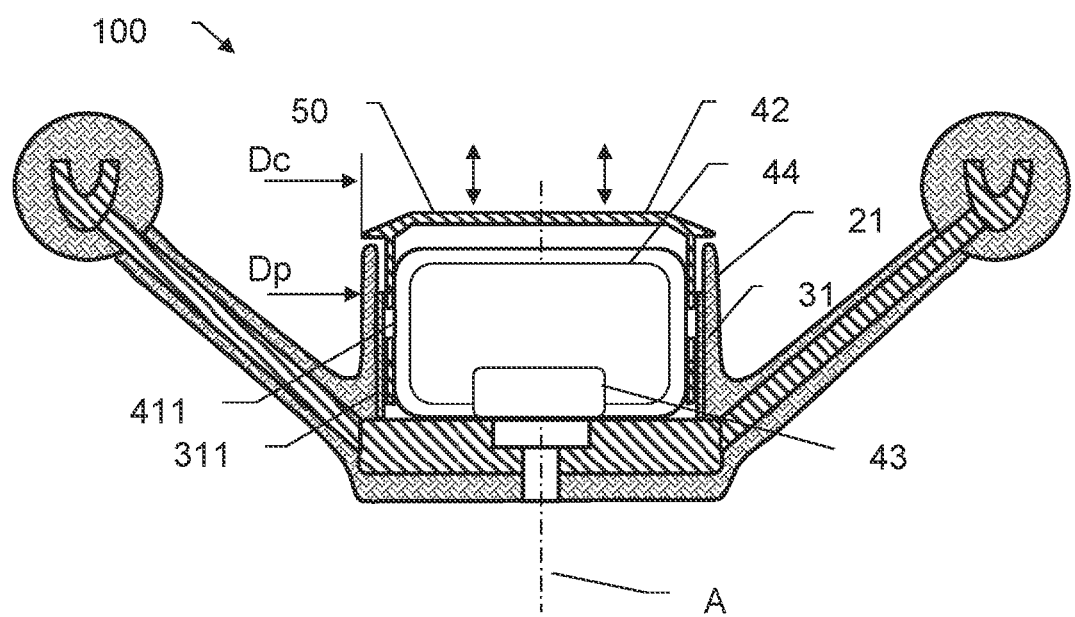

[Fig. 3]
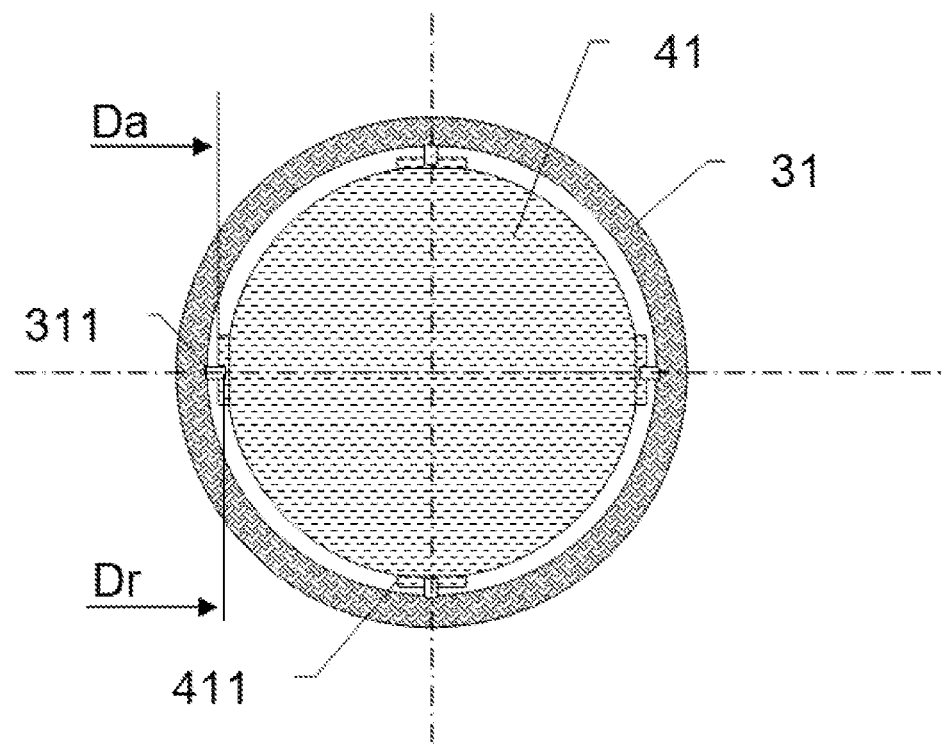

VEHICLE STEERING WHEEL COMPRISING A STEERING WHEEL CLADDING AND A SAFETY MODULE

CROSS-REFERENCE TO RELATED APPLICATIONS

This application claims priority pursuant to 35 U.S.C. 119(a) to France Patent Application No. 2008544, filed Aug. 18, 2020, which application is incorporated herein by reference in its entirety.

TECHNICAL FIELD OF THE INVENTION

The present invention generally relates to an automotive vehicle steering wheel, and in particular to a vehicle steering wheel equipped with a safety module otherwise known as airbag, housed in a cavity or housing formed in the cladding of the vehicle steering wheel.

STATE OF THE ART

Known in the prior art are vehicle steering wheels with an on-board safety module. For example, document DE19625722 A1 discloses an airbag module provided with projecting side tabs; these side tabs are designed in such a way that in the displacement trajectory of the airbag module relative to the base plate along side-guides there is a distance that guarantees that, when it is pressed, the airbag module can oscillate or shift slightly between the guides, so that the pressure exerted at any point of the airbag module triggers the corresponding displacement movement.

However, this system has the particular disadvantage of requiring precise fits in order to offer uniform and aesthetic clearances to the user, which typically generates quality costs, or limits the freedom of design.

DISCLOSURE OF THE INVENTION

A purpose of the present invention is to address the aforementioned disadvantages of the prior art and in particular, firstly to propose a vehicle steering wheel equipped with a safety module that provides uniform and aesthetic clearances to the user, without however generating quality costs or limiting the freedom of design.

A first aspect of the invention therefore relates to a vehicle steering wheel comprising:
 a frame supporting at least a frame cladding portion visible to an occupant of the vehicle, and a module housing comprising a housing wall integral with the frame cladding portion,
 a safety module at least partially arranged in the module housing and comprising a module cladding portion visible to the occupant of the vehicle, characterized:
 in that the safety module comprises at least one bearing surface,
 and in that, during a mounting movement of the safety module in the module housing, the housing wall is placed in a reference position by the bearing surface, so that the frame cladding portion has a predefined fit with the module cladding portion.

The vehicle steering wheel according to the foregoing implementation comprises bearing surfaces provided on the safety module, which place the housing wall in a precise reference position (typically during mounting), so as to have a predefined fit with the module cladding portion. In other words, the bearing surfaces act at basic points or surfaces that displace or deform or shape the housing wall so that said housing wall occupies a desired reference or final position with a low tolerance, even if manufacturing tolerances are higher. To summarize, the housing wall before mounting may occupy an initial position for which the position has a higher manufacturing tolerance, and during mounting of the safety module on the vehicle steering wheel, the safety module deforms the housing wall in order to bring it into a final position that has a low assembly tolerance. To that end, at least one interference or negative clearance is provided between the housing wall and the safety module before mounting.

According to one implementation, the housing wall may be movable between an initial position occupied before mounting of the safety module and the reference position occupied after mounting of the safety module. According to this implementation, the wall is made to be sufficiently flexible or thin or deformable in order to be able to be displaced during the mounting of the safety module. Such a displacement may advantageously be provided in the elastic range (with return to position possible during disassembly in order to exchange parts). However, an at least partially definitive deformation may be provided (plastic deformation region).

According to one implementation, the initial position may be separated from the reference position by a displacement distance of the housing wall of at least 1 mm. Such an implementation makes it possible to guarantee that the manufacturing tolerances affecting the position of the housing wall before deformation will be compensated for or "reset to zero."

According to one implementation, the housing wall may be a foam wall, preferably made of a polymer such as polyurethane.

According to one implementation, the bearing surface may be a surface of a hook of a first part static relative to the frame of the steering wheel, arranged to engage with a second movable part relative to the frame of the steering wheel, when the safety module is mounted on the steering wheel. Such a hook, commonly present in this type of assembly, is typically produced with low tolerances, which makes it possible to reuse this portion or part of the steering wheel to provide an additional forming function of the housing wall.

According to one implementation, the second movable part may be a cover of the safety module.

According to one implementation, the second movable part may be a control part of an audible warning device, to be actuated by a user. In the case where the safety module is static, it involves an assembly called floating cover.

According to one implementation, the safety module may comprise a gas generator and an airbag, and the first static part may be a housing arranged to receive the gas generator and the airbag. The first static part is typically secured to the frame of the steering wheel (the metal part forming the framework or backbone of the steering wheel).

According to one implementation, the safety module may comprise a plurality of bearing surfaces, and preferably at least four bearing surfaces.

According to one implementation, the housing wall may comprise a plurality of reference surfaces, each one arranged opposite a bearing surface after mounting of the safety module. Before mounting of the safety module, a reference distance between two outer walls of two bearing surfaces may be greater than an initial distance between two respective reference surfaces. In other words, an interference fit is provided, or with negative clearance, or with interference between reference surfaces and bearing surface. In detail, a distance between a reference point of the vehicle steering wheel (for example an axis of rotation, called steering column axis) and a bearing surface is greater than a distance between the reference point of the vehicle steering wheel (for example an axis of rotation, called steering column axis) and the respective reference surface. More generally, the bearing surfaces form part of an assembly forming a male part, to be inserted into the housing comprising the reference surfaces and forming a female part, and before mounting, at the bearing surfaces, the male part has a greater dimension than that of the female part at reference surfaces. Consequently, the female part is displaced or shaped during the mounting by the male part, in order then to occupy a reference or final position different from the initial position.

According to one implementation, the bearing surface may be arranged on a side wall of the safety module.

According to one implementation, the housing wall may comprise at least one projection, such as a rib, arranged opposite the bearing surface.

A second aspect of the invention relates to an automotive vehicle comprising a vehicle steering wheel according to the first aspect of the invention.

DESCRIPTION OF THE FIGURES

Other characteristics and advantages of the present invention will become more apparent upon reading the detailed description of an embodiment of the invention, which is provided by way of example but in no manner limited thereto, and illustrated by the attached drawings, in which:

FIG. 1 shows a schematic cross-sectional view of a vehicle steering wheel comprising a safety module and a housing for accommodating the safety module, prior to mounting of the safety module;

FIG. 2 shows the schematic cross-sectional view of FIG. 1 after mounting of the safety module;

FIG. 3 shows a partial cross-section of the vehicle steering wheel along an axis III-III of FIG. 1.

DETAILED DESCRIPTION OF THE EMBODIMENT(S)

FIG. 1 shows a vehicle steering wheel 100 comprising a frame 10 forming a framework or backbone of the vehicle steering wheel 100, on which a frame cladding portion 20 is overmolded, visible to the occupant. In detail, the steering wheel comprises:
- a hub formed by a hub frame portion 11 overmolded by a hub cladding portion 21,
- a rim formed by a rim frame portion 13 overmolded by a rim cladding portion 23,
- at least one branch (preferably a plurality of branches, formed by a branch frame portion 12 overmolded by a branch cladding portion 22, connecting the rim to the hub.

The vehicle steering wheel also comprises a safety module 40, and the hub cladding portion 21 comprises a module housing 30, arranged to receive the safety module 40.

Conventionally, the safety module 40 comprises:
- an enclosure 41 that receives a gas generator 43 and an airbag 44,
- a cover 42, forming a module cladding part and the upper face whereof forms a module cladding portion 50 visible to the occupant.

In the case shown, the cover 42 is a floating cover that can slide on the enclosure 41 along a direction of a steering column axis A, in order to actuate an audible warning device. The enclosure 41 comprises protuberances or bearing surfaces 411 that project from the side face of the safety module 40, further forming retention hooks of the cover 42. Openings 421 (or slots) are made in the cover 42 opposite retention hooks, to enable the cover 42 to be moved in the vertical direction of FIG. 1.

The module housing 30 has a housing wall 31 on which ribs 311 are formed. In particular, the housing wall 31 is thin and tall in order to house the safety module 40. Moreover, the housing wall 31, like the rest of the frame cladding portion 20, is formed by a plastic material overmolded onto the frame 10. It typically involves polyurethane, and in particular a polyurethane foam.

Consequently, the dimensional and geometric tolerances of the housing wall 31 can be rather large, although it may be difficult to guarantee a precise fit between the frame cladding portion 20 and the module cladding portion 50 after mounting of the safety module 40.

Such a precise fit (a very small visible gap between the parts, visible spacings that are constant all along parts, etc.) participates greatly in perceived quality and should therefore be guaranteed.

To that end, it is provided, prior to mounting of the safety module 40, that the outside dimension Da of the bearing surfaces 411 is greater than the inside dimension Dr of the wall 31 of the module housing 30, and particularly at the ribs 311.

As shown in FIG. 3, which is a partial schematic cross-section of the assembly along axis III-III of FIG. 1, the ribs 311 have an inside dimension Dr (here a distance relative to the steering column axis A of FIG. 1) less than the outside dimension Da (here also a distance relative to the steering column axis A of FIG. 1) of the bearing surfaces 411.

During assembly of the safety module 40 in the vehicle steering wheel 100 as depicted in FIG. 1, and during the vertical approach movement represented by the indicator arrow 1, when the bearing surfaces 411 arrive at the ribs 311 of the housing wall 31, the housing wall 31 will then be pushed, or displaced or shaped in order to go from an initial position shown by dotted lines to the reference or final position shown by solid lines, as the indicator arrows 2 show. To summarize, the housing wall 31 is placed in the reference or final position by the bearing surfaces 411.

Once the safety module 40 is mounted in the vehicle steering wheel 100 as shown in FIG. 2, the frame cladding portion 20, and in particular the module cladding wall 21 with the housing wall 31, is properly aligned with the module cladding portion 50, and particularly the external shapes of the cover 42.

In particular, the frame and cladding portion 20, and especially the hub cladding portion 21 integral with the housing wall 31, is placed in the reference position of FIG. 2 by the bearing surfaces 411 of the safety module 40, so that the housing wall 31 and therefore the hub cladding portion 21 of FIG. 2 is aligned with the outer edge of the cover 42 and therefore the module cladding portion 50.

As shown diagrammatically in FIG. 2, the dimension Dp of the housing wall 31 is properly aligned and fitted to the dimension Dc of the cover 42, which achieves a quality visual aspect. It may also be noted that the cover 42 can be inserted and can return to the upper position without affecting the reference position of the housing wall 31.

Thus, the housing wall 31, inherently less easy to produce with great precision/reproducibility of shapes due to its nature (polyurethane foam overmolded onto thin material), is placed in the reference position by the bearing surfaces

411 of the safety module 40, which are typically produced with better precision/reproducibility of shapes.

INDUSTRIAL APPLICATION

The vehicle steering wheel described above is a product that may likely have industrial application.

It will be understood that different modifications and/or improvements which are obvious for the person skilled in the art may be made to the different embodiments of the invention described in this present description without departing from the scope of the invention.

In particular, reference is made to bearing surfaces 411, and one, two, three four may be provided as here, or even more. It may be provided for the bearing surfaces to be offset, or to provide them over the entire height of the safety module in order to place the housing wall and/or the frame cladding portion in the reference position at specific locations or regions.

It may also be provided to place the housing wall 31 and/or the frame cladding portion 20 in the reference position with different limitations/displacements/deformations according to the areas considered.

In the example given, the bearing surfaces 411 are outer surfaces of locking hooks of the cover 42 on the enclosure 41 of the safety module 40, but other functions for the bearing surfaces may also be considered.

The frame cladding portion 20 has been described as being an overmolded material, but it can also be provided to use the bearing surfaces to place or shape thin cladding parts into shell or other shapes, and produced for example from a composite material, injected plastic, wood, fabric or even metal.

The invention claimed is:

1. A vehicle steering wheel comprising:
    a frame supporting at least a frame cladding portion visible to a vehicle occupant, and a module housing comprising a housing wall integral with the frame cladding portion,
    a safety module at least partially arranged in the module housing and comprising a module cladding portion visible to the vehicle occupant,
    wherein:
    the safety module comprises at least one bearing surface, and during a mounting movement of the safety module in the module housing, the housing wall is placed in a reference position by the bearing surface, so that the frame cladding portion has a predefined fit with the module cladding portion
    wherein the bearing surface is a surface of a part of a first static part with respect to the frame of the steering wheel.

2. The vehicle steering wheel according to claim 1, wherein the housing wall is movable between an initial position occupied before mounting the safety module and the reference position, occupied after mounting the safety module.

3. The vehicle steering wheel according to claim 2, wherein the initial position is separated from the reference position by a displacement distance of the housing wall of at least 1 mm.

4. The vehicle steering wheel according to claim 1, wherein the housing wall is a foam wall made of a polymer such as polyurethane.

5. The vehicle steering wheel according to claim 1, wherein the safety module comprises a second movable part which is a cover of the safety module.

6. The vehicle steering wheel according to claim 5, wherein the second movable part is a control part of an audible warning device, to be actuated by a user.

7. The vehicle steering wheel according to claim 1, wherein the safety module comprises a gas generator and an airbag, and wherein the first static part is a housing arranged to receive the gas generator and the airbag.

8. The vehicle steering wheel according to claim 1, wherein the safety module comprises a plurality of bearing surfaces.

9. The vehicle steering wheel according to claim 8, wherein the housing wall comprises a plurality of reference surfaces, each arranged opposite a bearing surface after mounting of the safety module, and wherein, before mounting of the safety module, a reference distance between two outer walls of two bearing surfaces is greater than an initial distance between two respective reference surfaces.

10. The vehicle steering wheel according to claim 1, wherein the bearing surface is arranged on a side wall of the safety module.

11. The vehicle steering wheel according to claim 1, wherein the housing wall comprises at least one projection, such as a rib, arranged opposite the bearing surface.

12. The vehicle steering wheel according to claim 1 in combination with an automotive vehicle.

* * * * *